United States Patent
Kamo et al.

(10) Patent No.: US 11,177,501 B2
(45) Date of Patent: *Nov. 16, 2021

(54) PRODUCTION METHOD FOR NON-AQUEOUS ELECTROLYTE SECONDARY BATTERY ACTIVE MATERIAL PROVIDING LITHIUM INSERTION AND SOLUTION CONTACT

(71) Applicant: SHIN-ETSU CHEMICAL CO., LTD., Tokyo (JP)

(72) Inventors: Hiromichi Kamo, Takasaki (JP); Takakazu Hirose, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 63 days.

This patent is subject to a terminal disclaimer.

(21) Appl. No.: 15/740,570

(22) PCT Filed: Jul. 5, 2016

(86) PCT No.: PCT/JP2016/003197
§ 371 (c)(1),
(2) Date: Dec. 28, 2017

(87) PCT Pub. No.: WO2017/006561
PCT Pub. Date: Jan. 12, 2017

(65) Prior Publication Data
US 2018/0198158 A1      Jul. 12, 2018

(30) Foreign Application Priority Data

Jul. 7, 2015  (JP) .............................. JP2015-135800
Dec. 28, 2015  (JP) .............................. JP2015-256947

(51) Int. Cl.
*H01M 10/0525*   (2010.01)
*H01M 4/13*   (2010.01)
(Continued)

(52) U.S. Cl.
CPC ......... *H01M 10/0525* (2013.01); *H01M 4/13* (2013.01); *H01M 4/139* (2013.01);
(Continued)

(58) Field of Classification Search
CPC .... H01M 10/0525; H01M 4/139; H01M 4/48; H01M 4/13; H01M 10/0587;
(Continued)

(56) References Cited

U.S. PATENT DOCUMENTS 5,395,711 A    3/1995  Tahara et al.
7,459,236 B2   12/2008 Konishiike et al.
(Continued)

FOREIGN PATENT DOCUMENTS

CN    1591936 A       3/2005
JP    H11-283670 A    10/1999
(Continued)

OTHER PUBLICATIONS

Machine translation of JP2005-235439, Tabuchi Toru, 2005 (Year: 2005).*

(Continued)

*Primary Examiner* — Kwang Han
(74) *Attorney, Agent, or Firm* — Oliff PLC

(57) ABSTRACT

A production method of a negative electrode active material for non-aqueous electrolyte secondary batteries containing a silicon compound ($SiO_x$: $0.5 \leq x \leq 1.6$) that contains Li, includes: making a silicon compound into which the lithium has been inserted contact with a solution B containing a polycyclic aromatic compound or a derivative thereof or both thereof (here, the solution B contains one or more kinds selected from an ether-based solvent, a ketone-based solvent, an ester-based solvent, an alcohol-based solvent, and an amine-based solvent as the solvent); and making the silicon compound contact with a solution C (here, the
(Continued)

solution C contains one or more kinds selected from an alcohol-based solvent, a carboxylic acid-based solvent, and water as the solvent). Thereby, a production method of a negative electrode active material for non-aqueous electrolyte secondary batteries is capable of increasing a battery capacity and improving the cycle characteristics.

8 Claims, 1 Drawing Sheet

(51) Int. Cl.
    *H01M 4/48*     (2010.01)
    *H01M 4/139*     (2010.01)
    *H01M 4/1391*     (2010.01)
    *H01M 4/1395*     (2010.01)
    *H01M 4/38*     (2006.01)
    *H01M 4/485*     (2010.01)
    *H01M 10/0569*     (2010.01)
    *H01M 4/02*     (2006.01)
    *H01M 10/0587*     (2010.01)

(52) U.S. Cl.
    CPC ....... *H01M 4/1391* (2013.01); *H01M 4/1395* (2013.01); *H01M 4/386* (2013.01); *H01M 4/48* (2013.01); *H01M 4/485* (2013.01); *H01M 10/0569* (2013.01); *H01M 10/0587* (2013.01); *H01M 2004/027* (2013.01); *H01M 2004/028* (2013.01)

(58) Field of Classification Search
    CPC .. H01M 10/0569; H01M 4/485; H01M 4/386; H01M 4/1395; H01M 4/1391; H01M 2/16; H01M 2004/028; H01M 2004/027; H01M 4/131; H01M 4/0459; C01P 2006/40; C01B 33/325; Y02E 60/10
    See application file for complete search history.

(56) References Cited

U.S. PATENT DOCUMENTS

| | | | |
|---|---|---|---|
| 8,377,592 B2 | 2/2013 | Jeong et al. | |
| 2005/0118083 A1* | 6/2005 | Tabuchi | H01G 9/022 423/179.5 |
| 2006/0099507 A1 | 5/2006 | Kogetsu et al. | |
| 2008/0176137 A1 | 7/2008 | Endo et al. | |
| 2009/0202911 A1 | 8/2009 | Fukuoka et al. | |
| 2011/0135810 A1 | 6/2011 | Yakovleva et al. | |
| 2015/0072220 A1 | 3/2015 | Kajita et al. | |

FOREIGN PATENT DOCUMENTS

| | | | | |
|---|---|---|---|---|
| JP | 2997741 B2 | 1/2000 | | |
| JP | 2000-195505 A | 7/2000 | | |
| JP | 2001-185127 A | 7/2001 | | |
| JP | 2002-042806 A | 2/2002 | | |
| JP | 2005-108826 A | 4/2005 | | |
| JP | 2005-235439 | * | 9/2005 | ............ H01M 10/40 |
| JP | 2005-235439 A | 9/2005 | | |
| JP | 2005-235589 | * | 9/2005 | ............ H01M 10/05 |
| JP | 2005-235589 A | 9/2005 | | |
| JP | 2006-114454 A | 4/2006 | | |
| JP | 2006-164954 A | 6/2006 | | |
| JP | 2007-234255 A | 9/2007 | | |
| JP | 2008-177346 A | 7/2008 | | |
| JP | 2008-251369 A | 10/2008 | | |
| JP | 2008-282819 A | 11/2008 | | |
| JP | 2009-070825 A | 4/2009 | | |
| JP | 2009-205950 A | 9/2009 | | |
| JP | 2009-212074 A | 9/2009 | | |
| JP | 2013-513206 A | 4/2013 | | |
| WO | 2013/146569 A1 | 10/2013 | | |

OTHER PUBLICATIONS

Machine translation of JP2005-235589, Funabiki et al., 2005 (Year: 2005).*
Jan. 17, 2019 Extended European Search Report issued in European Patent Application No. 16821036.7.
Oct. 9, 2019 Office Action issued in Taiwanese Applictaion No. 105121599.
Jan. 9, 2018 International Preliminary Report on Patentability issued in Japanese Patent Application No. PCT/JP2016/003197.
Dec. 25, 2018 Office Action issued in Japanese Patent Application No. 2017-527081.
Oct. 16, 2020 Office Action issued in Chinese Patent Application No. 201680039912.7.
Oct. 11, 2016 Search Report issued in Japanese Patent Application No. PCT/JP2016/003197.
Apr. 3, 2020 Office Action issued in Chinese Patent Application No. 201680039912.7.
May 26, 2020 Office Action issued in Japanese Patent Application No. 2019-31773.
Mar. 16, 2021 Office Action issued in Chinese Application No. 201680039912.7.
Aug. 24, 2021 Office Action issued in Chinese Application No. 201680039912.7.

* cited by examiner

[FIG. 1]
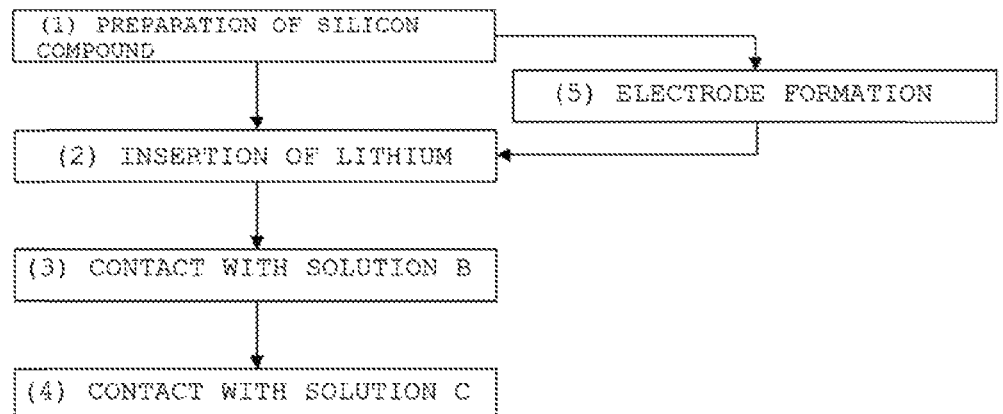
[FIG. 2]
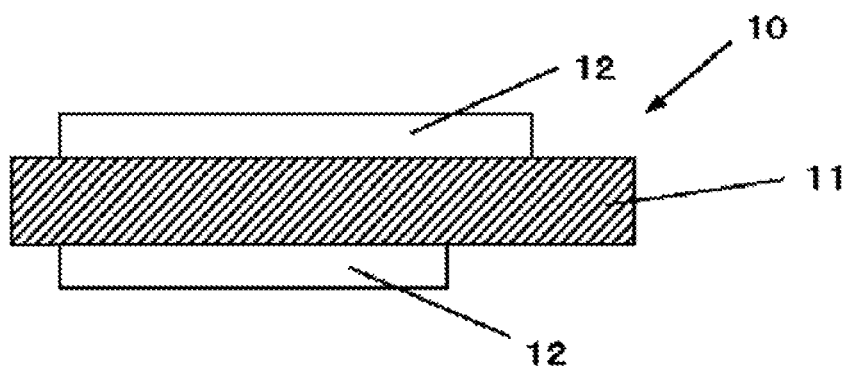
[FIG. 3]
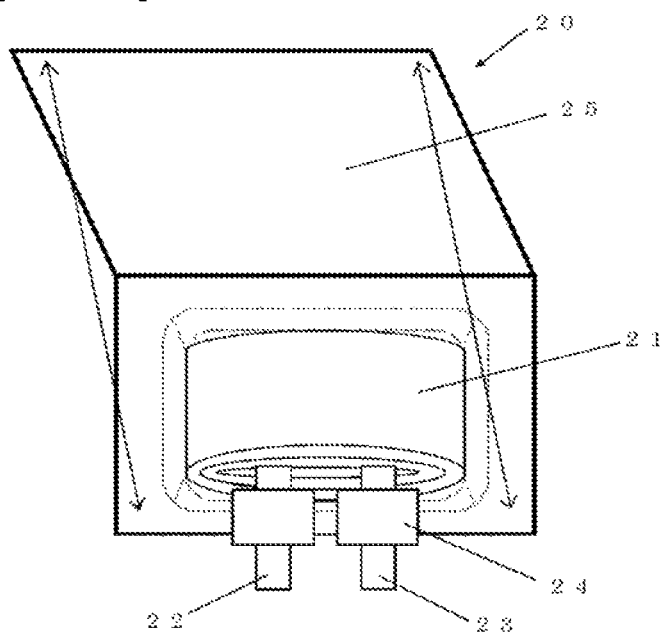

PRODUCTION METHOD FOR NON-AQUEOUS ELECTROLYTE SECONDARY BATTERY ACTIVE MATERIAL PROVIDING LITHIUM INSERTION AND SOLUTION CONTACT

TECHNICAL FIELD

The present invention relates to a production method of a negative electrode active material for non-aqueous electrolyte secondary batteries, a production method of a negative electrode for non-aqueous electrolyte secondary batteries, and a non-aqueous electrolyte secondary battery.

BACKGROUND ART

In recent years, small-sized electronic devices represented by mobile terminals and the like have been widely spread and further down-sizing, lighter weight and longer life are strongly demanded. To a market demand like this, secondary batteries capable of obtaining, in particular, a smaller size, a lighter weight and a higher energy density have been developed. The secondary batteries are studied to apply also to, without limiting to small-sized electronic devices, large-sized electronic devices represented by automobiles and power-storage systems represented by houses or the like.

Among these, a lithium ion secondary battery is highly expected because it may readily obtain a smaller size and higher capacity and may obtain the energy density higher than that of a lead battery or a nickel-cadmium battery.

A lithium ion secondary battery includes an electrolytic solution together with a positive electrode and a negative electrode, and a separator. The negative electrode includes a negative electrode active material involving a charge/discharge reaction.

As the negative electrode active material, a carbon material is widely used. On the one hand, a further improvement in the battery capacity is demanded from recent market demand. As a factor for improving the battery capacity, it has been studied to use silicon as the negative electrode active material. This is because a great improvement of the battery capacity may be expected since silicon has a theoretical capacity (4199 mAh/g) no smaller than 10 times the theoretical capacity of graphite (372 mAh/g). A development of a silicon material as the negative electrode active material includes studies on not only a silicon simple substance but also on compounds represented by alloys, oxides or the like. Further, shapes of the active material have been studied, regarding the carbon material, from a standard coating type to an integrated type directly deposited on a current collector.

However, when, as the negative electrode active material, the silicon is used as a main raw material, since particles of the negative electrode active material expand and contract during charge/discharge, mainly the neighborhood of a superficial layer of the particles of negative electrode active material tends to crack. Further, an ionic substance is generated inside of the active material, the particles of negative electrode active material tends to crack. When a superficial layer of the particles of negative electrode active material is broken, a new surface is generated thereby, and a reaction area of the particles of negative electrode active material increases. At this time, since a decomposition reaction of an electrolytic solution occurs on the new surface and a film that is decomposition product of the electrolytic solution is formed on the new surface, the electrolytic solution is consumed. Therefore, cycle characteristics of the battery tends to degrade.

Until now, in order to improve an initial efficiency and the cycle characteristics of the battery, negative electrode materials for lithium ion secondary batteries having the silicon material as a main material and electrode configurations have been variously studied.

Specifically, in order to obtain excellent cycle characteristics and high safety, silicon and amorphous silicon dioxide are simultaneously deposited by using a gas phase method (see, for example, Patent Document 1). Further, in order to obtain high battery capacity and safety, a carbon material (an electron conductor) is provided on a superficial layer of particles of silicon oxide (see, for example, Patent Document 2). Further, in order to improve the cycle characteristics and to obtain high input/output characteristics, an active material containing silicon and oxygen is prepared and an active material layer having a high oxygen ratio in the neighborhood of a current collector is formed (see, for example, Patent Document 3). Still further, in order to improve the cycle characteristics, oxygen is contained in a silicon active material such that an average oxygen content is not higher than 40 at. %, and an oxygen content is high in a position close to a current collector (see, for example, Patent Document 4).

Further, in order to improve an initial charge/discharge efficiency, a nano composite containing a Si phase, $SiO_2$ and a $M_yO$ metal oxide is used (see, for example, Patent Document 5). Still further, in order to improve an initial charge/discharge efficiency, pre-doping in which a Li-containing material is added to a negative electrode, and Li is decomposed in a place where a negative electrode potential is high and is returned to a positive electrode is performed (see, for example, Patent Document 6).

Still further, in order to improve the cycle characteristics, $SiO_x$ ($0.8 \leq x \leq 1.5$, particle size range=1 μm to 50 μm) and a carbon material are mixed and sintered at a high temperature (see, for example, Patent Document 7). Further, in order to improve the cycle characteristics, a mol ratio of oxygen to silicon in a negative active material is set to 0.1 to 1.2, and in the range where a difference of a maximum value and a minimum value of the mol ratios of an oxygen amount to a silicon amount is not larger than 0.4 in the neighborhood of an interface of the active material and a current collector, an active material is controlled (see, for example, Patent Document 8). Still further, in order to improve battery load characteristics, a metal oxide containing lithium is used (see, for example, Patent Document 9). Further, in order to improve the cycle characteristics, a hydrophobic layer such as a silane compound is formed on a superficial layer of a silicon material (see, for example, Patent Document 10).

Still further, in order to improve the cycle characteristics, a silicon oxide is used, and a graphite film is formed on a superficial layer thereof to impart conductivity (see, for example, Patent Document 11). In this case, in the Patent Document 11, regarding a shift value obtained from a Raman spectrum of the graphite film, broad peaks appear at 1330 $cm^{-1}$ and 1580 $cm^{-1}$, and an intensity ratio thereof $I_{1330}/I_{1580}$ is $1.5<I_{1330}/I_{1580}<3$.

Further, in order to improve high battery capacity and cycle characteristics, particles having a silicon crystallite phase dispersed in a silicon dioxide are used (see, for example, Patent Document 12). Still further, in order to improve overcharge and overdischarge characteristics, a silicon oxide in which an atomic ratio of silicon and oxygen is controlled to 1:y (0<y<2) is used (see, for example, Patent Document 13).

Further, in order to improve high battery capacity and initial efficiency, there is a method in which an alloy-based material is contacted with a solution containing an alkali metal and a polycyclic aromatic compound, followed by soaking in a solution that desorbs an alkali metal element (see, for example, Patent Document 14).

CITATION LIST

Patent Literature

Patent Document 1: Japanese Unexamined Patent publication (Kokai) No. 2001-185127
Patent Document 2: Japanese Unexamined Patent publication (Kokai) No. 2002-042806
Patent Document 3: Japanese Unexamined Patent publication (Kokai) No. 2006-164954
Patent Document 4: Japanese Unexamined Patent publication (Kokai) No. 2006-114454
Patent Document 5: Japanese Unexamined Patent publication (Kokai) No. 2009-070825
Patent Document 6: Japanese Unexamined Patent publication (Kohyo) No. 2013-513206
Patent Document 7: Japanese Unexamined Patent publication (Kokai) No. 2008-282819
Patent Document 8: Japanese Unexamined Patent publication (Kokai) No. 2008-251369
Patent Document 9: Japanese Unexamined Patent publication (Kokai) No. 2008-177346
Patent Document 10: Japanese Unexamined Patent publication (Kokai) No. 2007-234255
Patent Document 11: Japanese Unexamined Patent publication (Kokai) No. 2009-212074
Patent Document 12: Japanese Unexamined Patent publication (Kokai) No. 2009-205950
Patent Document 13: Japanese Patent No. 2997741
Patent Document 14: Japanese Unexamined Patent publication (Kokai) No. 2005-235439

SUMMARY OF INVENTION

Technical Problem

As was described above, in recent years, higher performance and multi-functionalization of small-sized electronic devices typical in the mobile terminals have been proceeded, a secondary battery that is a main power source thereof, in particular, a lithium ion secondary battery is required to have an increased battery capacity. As one measure to solve the problem, it is desired to develop a non-aqueous electrolyte secondary battery formed of a negative electrode that uses a silicon material as a main material. Further, the non-aqueous electrolyte secondary battery that uses the silicon material is desired to have the same cycle characteristics as a non-aqueous electrolyte secondary battery that uses the carbon material.

There, by using the silicon oxide modified by insertion and partial desorption of Li as a negative electrode active material, a cycle retention rate and an initial efficiency of the battery have been improved. However, due to modification with Li, the silicon oxide after modification has relatively low water resistance. Therefore, there was a problem such that stabilization of a slurry containing the silicon oxide after modification which is prepared during production of the negative electrode tends to be insufficient.

Further, even when the alkali metal is desorbed from the alloy-based material after modification by the method disclosed in Patent Literature 14, the activity of the alloy-based material remains high. Therefore, there was a problem that in an electrode preparation step, when an aqueous slurry is formed from the alloy-based material, a Li alloy having the same activity as a Li metal violently reacts with water or a binder (a reaction accompanying ignition or boiling of solvent) to be difficult to prepare a slurry. Still further, when a non-aqueous electrolyte secondary battery is prepared with the slurry undergone an unnecessary high temperature state due to the violent reaction like this, there was a problem that the battery characteristics are degraded. Further, when this method is applied after forming an electrode from the alloy-based material, because a Li portion is insufficiently deactivated, the deactivation occurs under a low humidity environment (dew point of −20° C. at room temperature of 20°), excess Li compounds such as Li oxide, hydroxide, carbonate or the like are generated on a surface to deteriorate the battery characteristics.

The present invention was performed in view of the problems such as described above and intends to provide a production method of a negative electrode active material for non-aqueous electrolyte secondary batteries capable of increasing the battery capacity and improving the cycle characteristics.

Solution To Problem

In order to achieve the above object, the present invention provides a production method of a negative electrode active material for non-aqueous electrolyte secondary batteries containing a silicon compound ($SiO_x$:0.5≤x≤1.6) that contains Li, including the steps of: preparing a silicon compound ($SiO_x$:0.5≤x≤1.6); inserting lithium into the silicon compound; making the silicon compound into which the lithium has been inserted contact with a solution B (here, the solution B contains one or more kinds selected from an ether-based solvent, a ketone-based solvent, an ester-based solvent, an alcohol-based solvent, and an amine-based solvent as the solvent) containing a polycyclic aromatic compound or a derivative thereof or both thereof; and making the silicon compound that has been contacted with the solution B contact with a solution C (here, the solution C contains one or more kinds selected from the alcohol-based solvent, a carboxylic acid-based solvent, and water as the solvent).

In the production method of the negative electrode active material of the present invention, the silicon compound in which Li has been inserted is contacted with the solution B to desorb a part of active Li from the silicon compound to prevent a violent reaction (a reaction accompanying ignition or boiling of the solvent) from occurring in making contact with the solution C. Thus, the silicon compound does not cause the violent reaction and the battery characteristics may be suppressed from deteriorating due to heat generation during preparation of the electrode.

At this time, in the step of making the silicon compound contact with the solution B, it is preferable to make the silicon compound contact with the solution B for 3 minutes or longer.

When the silicon compound is contacted with the solution B for 3 minutes or longer, the active Li may be more sufficiently desorbed.

Further, at this time, it is preferable that, in the step of inserting lithium, the silicon compound is contacted with a solution A (here, the solution A has the ether-based solvent as the solvent) containing lithium for 3 minutes or longer to insert the lithium into the silicon compound.

Thus, the Li may be inserted without largely increasing the temperature. Thereby, in the silicon compound, since a crystalline Li silicate that causes deterioration of the cycle characteristics is difficult to occur, the cycle characteristics may be prevented from deteriorating. Further, by contacting with the solution A for 3 minutes or longer, the Li may be more sufficiently inserted into the silicon compound.

At this time, in the production method of the negative electrode active material of the present invention, as the solution A containing the lithium, a solution $A_1$ containing lithium and a polycyclic aromatic compound or its derivative or a straight chain polyphenylene compound or its derivative, or a solution $A_2$ containing lithium and an amine (here, the solution $A_1$ and solution $A_2$ contain the ether-based solvent as the solvent) may be used.

When the solvent like this is used as the solution A containing lithium, the Li may be more uniformly inserted in the silicon compound, in addition, the Li may be efficiently inserted.

Further, at this time, in the production method of the negative electrode active material of the present invention, as the solution A containing lithium, it is preferable to use the solution $A_1$.

When the solution $A_1$ is used, the Li may be particularly efficiently inserted. When the solution containing in particular the straight chain polyphenylene compound or its derivative is used as the solution $A_1$, the Li may be inserted particularly efficiently.

At this time, in the production method of the negative electrode active material of the present invention, it is preferable to use one or more kinds of naphthalene, anthracene, phenanthrene, naphthacene, pentacene, pyrene, picene, triphenylene, coronene, chrysene, and derivatives thereof as the polycyclic aromatic compound, and compounds in which aromatic rings are linearly bonded via a single bond, that is, one or more kinds of biphenyl, terphenyl, and derivative thereof as the straight chain polyphenylene compound. The triphenylene is categorized not to the straight chain polyphenylene compound but to the polycyclic aromatic compound, because the bond of the aromatic rings is circular.

As the polycyclic aromatic compound contained in the solution $A_1$ and solution B, and as the straight chain polyphenylene compound contained in the solution $A_1$, these compounds may be used.

Further, at this time, in the production method of the negative electrode active material of the present invention, one containing the alcohol-based solvent or water as the solvent is preferably used as the solution C.

As the solution C, specifically, these may be used.

At this time, in the production method of the negative electrode active material of the present invention, the method includes the step of forming an electrode containing the silicon compound before the step of inserting lithium, and to the silicon compound contained in the electrode, the step of inserting lithium, the step of making the silicon compound contact with the solution B, and the step of making the silicon compound contact with the solution C may be applied.

In the production method of the negative electrode active material of the present invention, after forming the silicon compound into the electrode, inserting lithium and contacting with the solution B and solution C may be performed. When the negative electrode active material is prepared like this, since the active Li portion contained in the silicon compound is deactivated in advance, even under low humidity environment, an excess Li compound is difficult to be generated on a surface of the active material, and the battery characteristics may be prevented from deteriorating.

Further, in order to achieve the above object, the present invention provides a non-aqueous electrolyte secondary battery having an electrode containing the negative electrode active material for non-aqueous electrolyte secondary batteries produced by the any one of the production methods of negative electrode active material for non-aqueous electrolyte secondary batteries.

By this configuration, since the battery characteristics may be suppressed from deteriorating due to heat generation during preparation of the electrode, generation of an excess Li compound on an electrode surface, or the like, non-aqueous electrolyte secondary batteries having excellent battery characteristics are formed.

Further, in order to achieve the above object, the present invention is a production method of a negative electrode for non-aqueous electrolyte secondary batteries containing a negative electrode active material containing a silicon compound $SiO_x$ ($0.5 \leq x \leq 1.6$) containing lithium and provides a production method of negative electrodes for non-aqueous electrolyte secondary batteries having the steps of: forming an electrode containing the silicon compound $SiO_x$ ($0.5 \leq x \leq 1.6$); inserting Li in the silicon compound contained in the electrode; making the electrode containing the silicon compound in which the lithium has been inserted contact with the solution B (here, the solution B contains one or more kinds selected from an ether-based solvent, a ketone-based solvent, an ester-based solvent, an alcohol-based solvent, and an amine-based solvent as the solvent) containing a polycyclic aromatic compound or its derivative or both thereof to make the solution B contact with the silicon compound; making the electrode that has been contacted with the solution B contact with a solution C (here, the solution C contains one or more kinds of the alcohol-based solvent, a carboxylic acid-based solvent, and water as the solvent) to make the solution C contact with the silicon compound.

According to the method like this, since the active Li portion contained in the silicon compound is deactivated in advance, even under a low humidity environment, a negative electrode in which an excess Li compound is difficult to be generated on a surface of the active material may be produced. Thus, the battery characteristics of the non-aqueous electrolyte secondary batteries using the negative electrode produced according to this method may be prevented from deteriorating.

Further, the present invention provides a non-aqueous electrolyte secondary battery provided with the negative electrode for the non-aqueous electrolyte secondary batteries produced according to the production method of the negative electrode for the non-aqueous electrolyte secondary batteries.

By this configuration, since the battery characteristics may be suppressed from deteriorating due to heat generation during preparation of the electrode, generation of an excess Li compound on an electrode surface, or the like, non-aqueous electrolyte secondary batteries having excellent battery characteristics are formed.

Further, in order to achieve the above object, the present invention is a production method of a negative electrode active material for non-aqueous electrolyte secondary batteries containing a silicon compound $SiO_x$ ($0.5 \leq x \leq 1.6$) containing lithium and provides a production method of a negative electrode active material for non-aqueous electrolyte secondary batteries having the steps of: making a silicon compound contact with a solution that contains lithium and a straight chain polyphenylene compound or its derivative and has an ether-based solvent as the solvent, or a solution that contains lithium and an amine and has the ether-based solvent as the solvent to insert the lithium into the silicon compound.

When the solutions like these are used, the Li may be more uniformly inserted into the silicon compound, and the Li may be efficiently inserted.

Advantageous Effects of Invention

The production method of the negative electrode active material and the production method of the negative electrode of the present invention may produce the negative electrode active material and the negative electrode capable of obtaining high capacity and excellent cycle characteristics and initial charge/discharge characteristics when applied to the non-aqueous electrolyte secondary batteries.

Further, also in secondary batteries containing the negative electrode active material produced by the production method of the present invention, the similar characteristics may be obtained. Still further, also in electronic devices, electric tools, electric vehicles, power storage systems or the like, the similar effect may be obtained.

BRIEF DESCRIPTION OF THE DRAWINGS

FIG. 1 shows a flowchart showing one example of a production method of a negative electrode active material of the present invention;

FIG. 2 is a schematic cross-sectional view showing one example of a configuration of a negative electrode using the negative electrode active material of the present invention; and FIG. 3 is an exploded diagram showing one example of a configuration of a non-aqueous electrolyte secondary battery (laminate film type lithium ion secondary battery) of the present invention.

DESCRIPTION OF EMBODIMENTS

In what follows, an embodiment of the present invention will be described. However, the present invention is not limited thereto.

As was described above, as one of methods for increasing the battery capacity of the non-aqueous secondary battery, it has been studied to use the negative electrode that uses the silicon material as a main material as the negative electrode of the non-aqueous secondary batteries.

The non-aqueous electrolyte secondary battery that uses the silicon material is desired to have the cycle characteristics close to the same with the non-aqueous electrolyte secondary battery that uses a carbon material. However, a negative electrode material that shows the cycle safety equivalent with the non-aqueous electrolyte secondary battery that uses the carbon material has not been proposed. Further, since the silicon compound containing, in particular, oxygen has low initial efficiency compared with the carbon material, improvement of the battery capacity was limited by that amount.

There, by using a silicon oxide modified by insertion and partial desorption of Li as a negative electrode active material, a cycle retention rate and an initial efficiency of the battery have been improved.

However, due to modification with Li, the silicon oxide after modification has relatively low water resistance. Therefore, there was a problem such that stabilization of the silicon oxide after modification to slurry tends to be insufficient during preparation of the negative electrode.

There, the present inventors have conducted intensive studies about a production method of a negative electrode active material capable of obtaining excellent cycle characteristics and initial efficiency when used in the negative electrode of the non-aqueous electrolyte secondary batteries and came to complete the present invention.

A production method of a negative electrode active material for non-aqueous electrolyte secondary batteries of the present invention, as shown in FIG. 1, first carries out preparing a silicon compound $SiO_x$ ($0.5 \le x \le 1.6$) (step 1 of FIG. 1). The silicon compound may be formed particle-like. Then, inserting lithium into the silicon compound is carried out (step 2 of FIG. 1). At this time, before inserting the lithium, in advance, forming an electrode containing the silicon compound may be carried out (step 5 of FIG. 1).

Subsequently, making the silicon compound in which the lithium has been inserted contact with a solution B (here, the solution B contains one or more kinds selected from an ether-based solvent, a ketone-based solvent, an ester-based solvent, an alcohol-based solvent, and an amine-based solvent as the solvent) containing a polycyclic aromatic compound or its derivative or both thereof is carried out (step 3 of FIG. 1). Then, making the silicon compound that has been contacted with the solution B contact with a solution C (here, the solution C contains one or more kinds of an alcohol-based solvent, a carboxylic acid-based solvent, and water as the solvent) is carried out (step 4 of FIG. 1). Further, when carrying out the steps 3 and 4 after formation of the electrode by undergoing a step 5, for example, by soaking the electrode in the solution B and the solution C, or spraying the solution B and the solution C on the electrode, the solution B and the solution C may be brought into contact with the silicon compound contained in the electrode.

Since the negative electrode active material containing the silicon compound produced according to the production method of the present invention like this is a silicon-based active material mainly made of the silicon compound, the battery capacity may be made large. Further, by making the Li contain in the silicon compound, the irreversible capacity may be reduced at the time of initial charge/discharge of the battery containing the silicon-based active material. Further, when the production method of the negative electrode active material of the present invention contains the step 3 and the step 4 of FIG. 1, which are inactivation steps of Li contained in the silicon compound, the Li contained in the silicon compound is sufficiently deactivated, thus, the negative electrode active material becomes difficult to cause the violent reaction with an aqueous slurry.

Further, when steps of inserting the lithium and making contact with the solution B and the solution C (step 2 to step 4) are carried out after forming the silicon compound into the electrode, since the active Li portion contained in the silicon compound is deactivated in advance and an excess lithium compound is difficult to be generated on a surface of the active material, the battery characteristics may be suppressed from deteriorating.

Subsequently, the production method of the negative electrode active material of the present invention will be specifically described.

(1. Production Method of Negative Electrode Active Material)

First, the silicon compound $SiO_x$ ($0.5 \leq x \leq 1.6$) is prepared (step 1 of FIG. 1). The silicon compound represented by the general formula $SiO_x$ ($0.5 \leq x \leq 1.6$) like this may be prepared according to, for example, the following method. First, a raw material that generates a silicon oxide gas is heated in the temperature range of from 900° C. to 1600° C. under the presence of an inert gas or under reduced pressure to generate the silicon oxide gas. In this case, as the raw material, a mixture of a metallic silicon powder and a silicon dioxide powder may be used, and, when considering the presence of surface oxygen of the metallic silicon powder and a slight amount of oxygen in a reaction furnace, a mixing mole ratio is desirable to be in the range of 0.8<metallic silicon powder/silicon dioxide powder<1.3. A gas generated from the raw material is deposited on an absorption plate. Subsequently, a deposit is taken out in a state where a temperature in the reaction furnace is lowered to not higher than 100° C., followed by pulverizing and powderizing using a ball mill or a jet mill. It is to be noted that the crystallinity such as a size of Si crystallites of the silicon compound may be controlled by adjusting a charge range (mixing molar ratio) or a heating temperature of the raw material. Further, the crystallinity may be controlled also by heat treating after generation of the silicon compound.

In particular, the silicon compound is preferably prepared such that a half-width value (2θ) of a diffraction peak due to a Si(111) crystal plane obtained by X-ray diffractometry is not smaller than 1.2° and a crystallite size due to the crystal plane is not larger than 7.5 nm.

The silicon compound having such half-value width and crystallite size may improve the battery characteristics because of low crystallinity and a small abundance of Si crystal. Further, when the silicon compound having low crystallinity like this is present, a stable silicon compound may be generated.

Further, as the composition of the silicon compound to be prepared, x is preferably closer to 1. This is because high cycle characteristics may be obtained. Still further, the composition of the silicon compound in the present invention does not necessarily mean purity of 100%, and may contain a slight amount of impurities.

Further, the silicon compound may be composited with a carbon material. As a method of compositing, there are methods of preparing a carbon film on a surface of the silicon compound such as a thermal CVD (Chemical Vapor Deposition) method, a method of physically mixing the silicon compound and the carbon material, or the like. By compositing the carbon material with the silicon compound, high conductivity may be imparted.

In particular, as a method of generating the carbon film on the surface of the silicon compound, the thermal CVD method is desirable. In the thermal CVD method, first, the silicon compound is set in a furnace. Then, a hydrocarbon gas is filled in the furnace followed by elevating an inner furnace temperature. By elevating the inner furnace temperature, the hydrocarbon gas is decomposed and the carbon film is formed on a surface of the silicon compound. A decomposition temperature of the hydrocarbon gas is not particularly limited but is desirably not higher than 1200° C., and particularly desirably not higher than 950° C. This is because unintended disproportionation of the silicon compound may be suppressed.

When the carbon film is formed by the thermal CVD method, by controlling, for example, the inner furnace pressure and temperature, while adjusting a coverage or a thickness of the carbon film, the carbon film may be formed on a superficial layer of the powder material.

The hydrocarbon gas used in the thermal CVD method is not particularly limited but desirably $3 \leq n$ in a $C_nH_m$ composition. This is because the production cost may be reduced and the physical properties of a decomposition product are excellent.

Subsequently, lithium is inserted into the silicon compound (step 2 of FIG. 1). At this time, before inserting the lithium, an electrode containing the silicon compound may be formed in advance (step 5 in FIG. 1).

The negative electrode active material of the present invention contains the silicon compound capable of storing and releasing lithium ions. And, the Li is contained on a surface, in the inside, or in both thereof of the silicon compound to which the production method of the present invention was applied. The silicon compound containing Li like this may be obtained by selectively modifying (hereinafter, referred to as selective modification) a part of a $SiO_2$ component generated inside of the silicon compound to a Li compound.

More specifically, by making the silicon compound contact with a solution that contains lithium and a straight chain polyphenylene compound or its derivative and has the ether-based solvent as the solvent or a solution that contains lithium and an amine and has the ether-based solvent as the solvent, the lithium may be inserted in the silicon compound.

At this time, as was described above, in advance, an electrode containing the silicon compound is formed, and the lithium may be inserted to the silicon compound contained in the electrode by the solution.

Further, by making the silicon compound contact with the solution A containing lithium (here, the solution A has the ether-based solvent as the solvent) for 3 minutes or longer, the lithium may be inserted into the silicon compound. Further, as the solution A containing lithium, a solution $A_1$ containing lithium and a polycyclic aromatic compound or its derivative or a straight chain polyphenylene compound or its derivative, or a solution $A_2$ containing lithium and an amine (however, the solution $A_1$ and solution $A_2$ containing the ether-based solvent as the solvent) are preferably used.

Thus, when a method where the solution A (here, the solvent is the ether-based solvent) is brought into contact with the silicon compound to insert lithium is used, compared with, for example, the case where the thermal doping method in which the silicon compound and metallic lithium are mixed and heated or the like is used, disproportionation inside the silicon compound is suppressed, and the cycle characteristics are further improved. Further, since the lithium is complexed with the polycyclic aromatic compound, the straight chain polyphenylene compound or the amine and dissolved in the solution, the Li may be inserted more uniformly into the silicon compound. Among these, the solution $A_1$ that contains the lithium and the polycyclic aromatic compound or the straight chain polyphenylene compound is particularly preferably used. This is because the lithium insertion reaction by the solution $A_1$ may be handled in the neighborhood of the room temperature, and, further, the lithium is complexed with the polycyclic aromatic compound or the straight chain polyphenylene compound and dissolved in the solution, and the Li may be more uniformly inserted into the silicon compound. Further, by using the ether-based solvent as the solvent, since the complex of the lithium with the polycyclic aromatic compound or the straight chain polyphenylene compound or the amine is more stabilized, the lithium may be more efficiently inserted into the silicon compound.

According to the selective modification by the method like this, since the temperature is not raised excessively in the process of inserting the Li into the silicon compound, crystalline lithium silicate may be suppressed from being generated. When the crystalline Li silicate may be suppressed from being generated, since Li ion conductivity in the silicon compound is improved and further crystallization in the silicon compound becomes difficult to proceed, the cycle characteristics are further improved.

As the ether-based solvents used in the solutions A, $A_1$ and $A_2$, diethyl ether, tert-butyl methyl ether, tetrahydrofuran, dioxane, 1,2-dimethoxy ethane, diethylene glycol dimethyl ether, triethylene glycol dimethyl ether, tetraethylene glycol dimethyl ether, or mixed solvents thereof may be used. Among these, in particular, tetrahydrofuran, dioxane and 1,2-dimethoxy ethane may be preferably used. These solvents are preferable to be dewatered and preferable to be deoxygenized.

Further, as the polycyclic aromatic compound contained in the solution $A_1$, one or more kinds of naphthalene, anthracene, phenanthrene, naphthacene, pentacene, pyrene, picene, triphenylene, coronene, chrysene, and derivatives thereof are used, and, as the straight chain polyphenylene compound contained in the solution $A_1$, one or more kinds of biphenyl, terphenyl, and derivatives thereof may be used.

A concentration of the polycyclic aromatic compound or the straight chain polyphenylene compound in the solution $A_1$ is preferably between $10^{-2}$ mol/L to 5 mol/L, and more preferably between $10^{-1}$ mol/L to 3 mol/L. When the concentration of the polycyclic aromatic compound or the straight chain polyphenylene compound is not smaller than $10^{-2}$ mol/L, a reaction between the lithium metal and the polycyclic aromatic compound or the straight chain polyphenylene compound tends to proceed, and a reaction time may be shortened. When the concentration of the polycyclic aromatic compound or the straight chain polyphenylene compound is not larger than 5 mol/L, a reaction product between the polycyclic aromatic compound or the straight chain polyphenylene compound and the lithium metal is difficult to attach to the silicon compound, and the silicon compound powder may be readily separated. Further, when the negative electrode active material is formed into the non-aqueous electrolyte secondary battery, a reaction residue is not eluted into the electrolytic solution, and the battery characteristics may be suppressed from deteriorating due to a side reaction. Further, the lithium metal is preferably contained in an amount of not smaller than 0.5 equivalent to the polycyclic aromatic compound or the straight chain polyphenylene compound and a part thereof may not be dissolved.

Further, as the amine contained in the solution $A_2$, dimethyl amine, ethyl amine, diethyl amine, ethylene diamine, and triethylene triamine may be used.

Further, a time during which the silicon compound and the solution A, A1, or the silicon compound and A2 are contacted is preferably set to 3 minutes or longer and 100 hours or shorter. When the contact time is not shorter than 3 minutes, a sufficient doping amount of lithium may be obtained. Further, at the time point when the contact time becomes 100 hours, the lithium insertion into the silicon compound reaches a substantial equilibrium state. Further, the reaction temperature is preferably from −20° to 200° C., and more preferably from 0° C. to 50° C. Among these, the reaction temperature is particularly preferably set to the neighborhood of 20° C. In the temperature range as was described above, since a reaction speed is difficult to decrease, and the lithium compound is difficult to generate precipitates due to a side reaction, a reaction rate of the lithium insertion reaction from the silicon compound is improved.

Subsequently, the silicon compound into which the lithium has been inserted is contacted with the solution B (here, the solution B contains one or more kinds selected from the ether-based solvent, the ketone-based solvent, the ester-based solvent, the alcohol-based solvent, and the amine-based solvent as the solvent) containing the polycyclic aromatic compound or its derivative or both thereof (step 3 of FIG. 1).

The polycyclic aromatic compound in the solution B reacts with the lithium contained in the silicon compound to form a complex. Since the complex is stable, the lithium desorption from the silicon compound proceeds. Further, in the solvent as was described above, since the complex between the polycyclic aromatic compound and the lithium may be present stable instantaneously or sustainably, without causing a rapid reaction (a reaction accompanying ignition or boiling of the solvent), the lithium is softly desorbed from the silicon compound.

Thus, in the step 3, by desorbing a part of active Li from the silicon compound, a violent reaction is prevented from occurring in the following step 4. It is to be noted that, only by passing the step 3, the desorption of the active Li is insufficient, when an electrode is prepared in this state, during preparation of an aqueous slurry, a reaction occurs with moisture in the slurry or a binder, sometimes, a large heat generation is caused, that is, an aqueous slurry capable of coating is not obtained, or if obtained, since the Li portion in the active material is eluted by the heat generation, the battery characteristics may not be improved. Since what has undergone the step 3 after forming the silicon compound into the electrode is also insufficient in the deactivation of the Li portion, when left in dry air (dew point: −20° C. or lower), the Li portion is gradually deactivated, lithium oxide, hydroxide or carbonate is generated on a surface to cause deterioration of the battery characteristics. Therefore, it is necessary to further deactivate the active lithium by carrying out a step 4 that is a next step like in the present invention.

As the polycyclic aromatic compound contained in the solution B, one or more kinds of naphthalene, anthracene, phenanthrene, naphthacene, pentacene, pyrene, picene, triphenylene, coronene, chrysene, and derivatives thereof may be used.

Further, as the ether-based solvent, diethyl ether, tert-butyl methyl ether, tetrahydrofuran, dioxane, 1,2-dimethoxy ethane, diethylene glycol dimethyl ether, triethylene glycol dimethyl ether, and tetraethylene glycol dimethyl ether may be used.

As the ketone-based solvent, acetone, acetophenone or the like may be used.

As the ester-based solvent, methyl formate, methyl acetate, ethyl acetate, propyl acetate, and isopropyl acetate may be used.

As the alcohol-based solvent, methanol, ethanol, propanol, and isopropyl alcohol may be used.

As the amine-based solvent, methyl amine, ethyl amine, and ethylene diamine may be used.

Among the ether-based solvents, ketone-based solvents, ester-based solvents, alcohol-based solvents, and amine-based solvents, mixed solvents obtained by mixing two or more kinds thereof may be used.

A concentration of the polycyclic aromatic compound in the solution B is preferably between from $10^{-2}$ mol/L to 5 mol/L, and particularly preferably between from $10^{-2}$ mol/L to 3 mol/L. When the concentration of the polycyclic aromatic compound is not smaller than $10^{-2}$ mol/L, a reaction between the lithium metal and the polycyclic aromatic compound tends to proceed, and a reaction time may be shortened. When the concentration of the polycyclic aromatic compound is not larger than 5 mol/L, a reaction product between the polycyclic aromatic compound and the lithium metal is difficult to attach to the silicon compound, and the silicon compound powder may be readily separated. Further, when the negative electrode active material is formed into the non-aqueous electrolyte secondary battery, a reaction residue is not eluted into the electrolytic solution, and the battery characteristics may be suppressed from deteriorating due to a side reaction.

Further, a time during which the solution B and the silicon compound are contacted is preferably set to 3 minutes or longer and 100 hours or shorter. When the contact time is not shorter than 3 minutes, a sufficient drawing amount of the lithium may be obtained. Further, at the time point when the contact time becomes 100 hours, the lithium desorption into the solution B from the silicon compound reaches a substantial equilibrium state. Further, the reaction temperature is preferable to be from $-20°$ to $200°$ C., and more preferable to be from $0°$ C. to $50°$ C. Particularly, the reaction temperature is preferably set in the neighborhood of $20°$ C. In the temperature range as was described above, since a reaction speed is difficult to decrease, and the lithium compound is difficult to generate precipitate due to a side reaction, a desorption rate of the lithium from the silicon compound is improved.

Further, in the step 3, while replacing the solution B with a new solution, the silicon compound and the solution B may be contacted a plurality of times.

Subsequently, the silicon compound that has been contacted with the solution B is brought into contact with the solution C (here, the solution C contains one or more kinds selected from the alcohol-based solvent, the carboxylic acid-based solvent, and water as the solvent) (step 4 of FIG. 1). In the explanation in the present invention, the solution C may not contain a solute. In this case, a solvent alone is called as the solution C.

In the step 4, the solution C and the silicon compound are brought into contact to completely deactivate the active Li. Thus, it is made possible to apply the silicon-based active material containing Li to the aqueous slurry. Further, regarding also what has undergone the step 2 to step 4 after forming the silicon compound into the electrode, since the Li is sufficiently deactivated, the electrode having resistance capable of enduring storage in air is formed.

In the step 4, the solution C is used. However, after mixing and stirring, for example, the ketone-based solvent and the silicon compound, by adding the alcohol-based solvent or the like, the solvents may be mixed over a plurality of steps.

As the alcohol-based solvent, methanol, ethanol, propanol, and isopropyl alcohol may be used.

As the carboxylic acid-based solvent, formic acid, acetic acid and oxalic acid may be used.

Further, when water is used as the solvent, other than pure water, aqueous solutions containing a solute such as ammonia water, lithium acetate/water, lithium carbonate/water and lithium hydroxide/water may be used.

Further, among the alcohol-based solvents, carboxylic acid-based solvents, and water, by combining two or more kinds thereof, mixed solvents may be used.

Among these, in particular, as the solution C, ones containing the alcohol-based solvent or water as the solvent are preferably used. In the alcohol-based solvents, the deactivation of the active Li in the silicon compound is preferable to proceed mildly and sufficiently. Further, since water has a large heat capacity, the deactivation of the active Li in the silicon compound preferably occurs without accompanying a large temperature increase.

As was described above, the negative electrode active material may be produced according to the production method of the negative electrode active material of the present invention. Subsequently, the production method of a negative electrode will be described.

2. Production Method of Negative Electrode (Configuration of Negative Electrode)

First, a configuration of the negative electrode will be described with reference to FIG. 2. As shown in FIG. 2, a negative electrode 10 may have a configuration having a negative electrode active material layer 12 on a negative electrode current collector 11. The negative electrode active material layer 12 may be provided on both sides or only one side of the negative electrode current collector 11.

(Negative Electrode Current Collector)

A negative electrode current collector is an excellent conductive material and is configured from a material that has strong mechanical strength. As the electric conductive material that may be used in the negative electrode current collector 11, for example, copper (Cu) or nickel (Ni) may be used. The conductive material is preferably a material that does not form an intermetallic compound with lithium (Li).

The negative electrode current collector 11 preferably contains carbon (C) or sulfur (S) other than the main element. This is because physical strength of the negative electrode current collector is improved. In particular, this is because, in the case of having an active material layer that expands during charge, when the current collector contains the above element, there is an effect of suppressing deformation of the electrode including the current collector. A content of the above contained element is not particularly limited but, in particular, is preferably not larger than 100 ppm. This is because higher deformation suppression effect may be obtained.

A surface of the negative electrode current collector 11 may be roughened or may not be roughened. Examples of the roughened negative electrode current collector include metal foils subjected to, for example, an electrolytic treatment, an embossing treatment, or a chemical etching treatment. Examples of the negative electrode current collector that is not roughened include, for example, a rolled metal foil or the like.

(Negative Electrode Active Material Layer)

The silicon-based active material produced according to the production method of the negative electrode active material of the present invention becomes a material that constitutes the negative electrode active material layer 12. The negative electrode active material layer 12 contains the silicon-based active material and may further contain, from the viewpoint of the battery design, other materials such as a negative electrode binder or a conductive assistant or the like. As the negative electrode active material, other than the silicon-based active material, a carbon-based active material may be contained.

The negative electrode like this may be produced by a coating method that uses the negative electrode active material produced according to the production method of the negative electrode active material of the present invention. The coating method is a method by which particles of the negative electrode active material and a binder, or as needs arise, the conductive assistant, or the carbon-based active material are mixed, followed by dispersing in an organic solvent or water and by coating.

In this case, first, the negative electrode active material produced according to the production method of the negative electrode active material of the present invention, the conductive assistant, the binder, and the solvent such as water are mixed to obtain an aqueous slurry. At this time, as needs arise, the carbon-based active material may be mixed.it is to be noted that, since the silicon-based active material produced according to the method of the present invention has a slight amount of active Li, the violent reaction with the aqueous slurry is not generated and the negative electrode active material layer may be stably formed. Next, the aqueous slurry is coated on a surface of the negative electrode current collector, dried, thus, the negative electrode active material layer 12 of FIG. 2 is formed.

As the conductive assistant, any one or more kinds of, for example, carbon black, acetylene black, graphite such as flake-like graphite, Ketjen black, carbon nano tube, and carbon nano fiber may be used. These conductive assistants are preferably particle-like one having a median diameter smaller than that of the silicon compound. In this case, as the conductive assistant, for example, acetylene black may be selected.

Further, as the binder, for example, carboxymethylcellulose, a styrene-butadiene rubber and polyacrylic acid may be used.

Further, as the carbon-based active material, for example, pyrolytic carbons, cokes, glassy carbon fibers, organic polymer sintered bodies, and carbon blacks may be used. Thus, the electric resistance of the negative electrode active material layer 12 may be lowered and expansion stress accompanying charging may be alleviated.

Further, like in the production method of the negative electrode of the present invention, the negative electrode may be prepared by carrying out inserting lithium, making contact with the solution B, and contacting with the solution C, after the electrode containing the prepared silicon compound is formed (step 5 of FIG. 1) after preparation of the silicon compound. More specifically, first, the electrode is formed, followed by inserting lithium in the silicon compound contained in the electrode. The lithium may be inserted, for example, by making contact the solution A with the electrode to make contact the solution A with the silicon compound in the electrode. Next, the electrode containing the silicon compound into which the lithium has been inserted is contacted with the solution B, thus, the silicon compound in the electrode is contacted with the solution B. Subsequently, by contacting the electrode that has been contacted with the solution B with the solution C, the silicon compound is contacted with the solution C. It is to be noted that, when the silicon compound in the electrode is contacted with the solutions A, B and C, the silicon compound contained in the electrode may be contacted with the solutions A, B and C, for example, by soaking the electrode in the solutions A, B and C, or by spraying the solutions A, B and C on the electrode.

(3. Lithium Ion Secondary Battery)

Next, a lithium ion secondary battery that uses the negative electrode for lithium ion secondary batteries will be described.

(Configuration of Laminate Film Type Secondary Battery)

A laminate film type secondary battery 20 shown in FIG. 3 houses a wound electrode body 21 mainly inside of a sheet-like exterior member 25. The wound electrode body 21 has a separator between a positive electrode and a negative electrode and is wound. Further, there is a case where the positive electrode and the negative electrode have a separator therebetween and house a laminate body. In any of electrode bodies, a positive electrode lead 22 is attached to the positive electrode, and a negative electrode lead 23 is attached to the negative electrode. An outermost periphery part of the electrode body is protected by a protective tape.

The positive and negative electrode leads are led in one direction, for example, from an inside toward an outside of the exterior member 25. The positive electrode lead 22 is formed of a conductive material such as, for example, aluminum or the like, and the negative electrode lead 23 is formed of a conductive material such as, for example, nickel or copper.

The exterior member 25 is a laminate film in which, for example, a fusion layer, a metal layer, and a surface protective layer are laminated in this order, and, in the laminate film, outer peripheral parts in the fusion layer of two sheets of film are fused, or, are stuck by an adhesive such that the fusion layer faces the wound electrode body 21. The fusion part is a film such as, for example, polyethylene or polypropylene, and the metal part is an aluminum foil. The protective layer is, for example, nylon or the like.

An adhesive film 24 is inserted between the exterior member 25 and the positive and negative electrode leads to prevent outer air from intruding. The material is, for example, a polyethylene, polypropylene, or polyolefin resin.

(Positive Electrode)

The positive electrode has, in the same manner as in the negative electrode 10 of, for example, FIG. 2, a positive electrode active material layer on both sides or on one side of a positive electrode current collector.

The positive electrode current collector is formed of a conductive material such as, for example, aluminum.

The positive electrode active material layer contains any one or more kinds of positive electrode materials capable of absorbing/releasing lithium ion, and, may contain other materials such as a binder, a conductive assistant, and a dispersant according to a design. In this case, details of the binder and the conductive assistant are the same as, for example, in the negative electrode binder and the negative electrode conductive assistant described above.

As the positive electrode material, a Li-containing compound is desirable. As the Li-containing compound, a composite oxide made of, for example, lithium and a transition metal element, or a phosphate compound having Li and the transition metal element may be used. Among these positive electrode materials, compounds containing at least one or more kinds of nickel, iron, manganese, and cobalt are preferred. Chemical formulas for these are represented by, for example, $Li_xM_1O_2$ or $Li_yM_2PO_4$. In the formulas, $M_1$ and $M_2$ represent at least one or more kinds of the transition metal elements. Values of x and y show different values depending on a battery charge/discharge state, but, are generally shown by $0.5 \leq x \leq 1.10$ and $0.05 \leq y \leq 1.10$.

As the composite oxide having lithium and the transition metal element, for example, a lithium-cobalt composite oxide ($Li_xCoO_2$) and a lithium-nickel composite oxide ($Li_xNiO_2$), and as the phosphate compound having lithium and the transition metal element, for example, a lithium-iron phosphate compound ($LiFePO_4$) and a lithium-iron-manganese phosphate compound ($LiFe_{1-u}Mn_uPO_4(0<u<1)$) may be used. When these positive electrode materials are used, high battery capacity may be obtained and excellent cycle characteristics may be also obtained.

(Negative Electrode)

The negative electrode has the same configuration as the negative electrode 10 for a lithium ion secondary battery 10 of FIG. 2 shown above and has the negative electrode active material layer 12, for example, on both sides of the current collector 11. The negative electrode preferably has a negative electrode charge capacity larger than an electric capacity (charge capacity as a battery) obtained from the positive electrode active material agent. This is because the lithium metal may be suppressed from depositing on the negative electrode.

The positive electrode active material layer is provided on a part of both sides of the positive electrode current collector, and the negative electrode active material layer is also provided on a part of both sides of the negative electrode current collector. In this case, the negative electrode active material layer provided on, for example, the negative electrode current collector is provided on a region where an opposing positive electrode active material layer is not present. This is because stable battery design is carried out.

A non-facing region, that is, a region where the above negative electrode active material layer and the positive electrode active material layer do not face is hardly influenced by the charge/discharge. Therefore, a state of the negative electrode active material layer is maintained just as immediately after the formation.

Thereby, a composition of the negative electrode active material or the like may be accurately investigated with excellent reproducibility irrespective of the presence or non-presence of the charge/discharge.

(Separator)

The separator separates the positive electrode and the negative electrode and allows passage of the lithium ion while preventing current short-circuit accompanying the contact of both electrodes. The separator is formed of a porous film made of, for example, a synthetic resin, or ceramic, and may have a laminate structure in which two or more kinds of porous films are laminated. Examples of the synthetic resin include polytetrafluoroethylene, polypropylene, and polyethylene.

(Electrolytic Solution)

At least a part of the active material layer or the separator is impregnated with a liquid electrolyte (electrolytic solution). The electrolytic solution has the electrolyte salt dissolved in the solvent and may contain other materials such as an additive or the like.

As the solvent, for example, a non-aqueous solvent may be used. Examples of the non-aqueous solvent include ethylene carbonate, propylene carbonate, butylene carbonate, dimethyl carbonate, diethyl carbonate, ethyl methyl carbonate, methyl propyl carbonate, 1,2-dimethoxy ethane, and tetrahydrofuran.

It is desirable to use at least one or more kinds among ethylene carbonate, propylene carbonate, dimethyl carbonate, diethyl carbonate, and ethyl methyl carbonate. This is because more excellent characteristics may be obtained. Further, in this case, more excellent characteristics may be obtained by combining a high viscosity solvent such as ethylene carbonate, or propylene carbonate and a low viscosity solvent such as dimethyl carbonate, ethyl methyl carbonate or diethyl carbonate. This is because dissociability or ionic mobility of the electrolyte salt is improved.

It is preferable to contain an unsaturated carbon bond cyclic carbonic ester as a solvent additive. This is because a stable film is formed on a surface of the negative electrode during charge/discharge and the electrolytic solution is suppressed from causing a decomposition reaction. Examples of the unsaturated carbon bond cyclic carbonic ester include vinylene carbonate and vinyl ethylene carbonate.

Further, it is preferable to contain a sultone (cyclic sulfonic acid ester) as the solvent additive. This is because the chemical stability of the battery is improved. Examples of the sultone include propane sultone and propene sultone.

Further, the solvent preferably contains an acid anhydride. This is because the chemical stability of the electrolytic solution is improved. As the acid anhydride, for example, propane disulfonic acid anhydride may be used.

The electrolyte salt may contain any one or more kinds of light metal salts such as, for example, lithium salts. As the lithium salt, for example, the following materials may be used. Lithium hexafluorophosphate ($LiPF_6$), lithium tetrafluoroborate ($LiBF_4$) or the like may be used.

A content of the electrolyte salt is preferably 0.5 mol/kg or larger and 2.5 mol/kg or smaller relative to the solvent. This is because high ionic conductivity is obtained.

(Production Method of Laminate Film Type Secondary Battery)

At the beginning, a positive electrode is prepared by using the above positive electrode material. First, a positive electrode mixture is formed by mixing the positive electrode active material and, as needs arise, a binder and a conductive assistant, followed by dispersing in an organic solvent to form a positive electrode mixture slurry. Subsequently, the mixture slurry is coated on the positive electrode current collector by a coating device such as a knife roll or a die coater with a die head and dried with hot air to obtain a positive electrode active material layer. At the end, the positive electrode active material layer is compression molded by a roll press machine or the like. At this time, heating may be applied. Further, the compression, heating may be repeated a plurality of times.

Next, by using the same operation procedure as in the preparation of the above negative electrode for lithium ion secondary batteries 10, the negative electrode active material layer is formed on the negative electrode current collector to form a negative electrode.

A positive electrode and a negative electrode are prepared by the same preparation procedure as in the above. In this case, on both sides of the positive electrode and negative electrode current collectors, the respective active material layers may be formed. At this time, in any of the electrodes, active material coating lengths on the both side parts may be displaced (see FIG. 2).

Subsequently, the electrolytic solution is prepared. Further subsequently, by using ultrasonic welding or the like, the positive electrode lead 22 of FIG. 3 is attached to the positive electrode current collector and the negative electrode lead 23 is attached to the negative electrode current collector. Then, the positive electrode and the negative electrode are laminated via the separator, or wound to prepare a wound electrode body, followed by adhering a protective tape to the outermost peripheral part thereof. Next, the wound body is molded to be a flat shape. Then, after inserting the wound electrode body between folded film-like exterior member 25, insulation parts of the exterior member are adhered by a thermal fusion method, and with only one direction opened, the wound electrode body is encapsulated. Then, an adhesive film 24 is inserted between the positive electrode lead 22, and the negative electrode lead 23 and the exterior member 25. A predetermined amount of the above prepared electrolytic solution is charged from a releasing part, followed by vacuum impregnation. After the impregnation, the releasing part is adhered by a vacuum thermal fusion method.

As was described above, the laminate film type secondary battery 20 may be produced.

EXAMPLE

In what follows, the present invention will be more specifically described with reference to examples and comparative examples of the present invention. However, the present invention is not limited to these examples.

Example 1-1

First, a silicon-based active material was prepared as shown below.

First, a raw material (vaporization starting material) in which metallic silicon and silicon dioxide are mixed was set in a reaction furnace, what was vaporized in an atmosphere having a degree of vacuum of 10 Pa was deposited on an absorption plate, after sufficiently cooling, a deposit ($SiO_x$: $0.5 \leq x \leq 1.6$) was taken out and pulverized by a ball mill. Then, a particle size of the particles of the silicon compound was adjusted by classifying. Thereafter, a carbon film was coated on a surface of particles of the silicon compound by performing thermal CVD.

Subsequently, powder of the silicon compound covered with the carbon film was soaked in a solution (solution $A_1$) in which a lithium piece and biphenyl were dissolved in tetrahydrofuran (hereinafter, referred to also as THF). The solution $A_1$ of Example 1-1 was prepared by dissolving biphenyl in the THF solvent at the concentration of 1 mol/L, followed by adding the lithium piece of a mass portion of 10% by mass relative to a mixed liquid of the THF and biphenyl. Further, a temperature of the solution when soaking the powder of the silicon compound was set to 20° C., and the soaking time was set to 10 hours. After that, the powder of the silicon compound was filtered. According to the above treatment, the lithium was inserted in the silicon compound.

Next, in a solution (solution B) in which naphthalene was dissolved in THF, the powder of the silicon compound after lithium insertion was soaked. The solution B of Example 1-1 was prepared by dissolving naphthalene in the THF solvent at the concentration of 2 mol/L. Further, a temperature of the solution when the powder of the silicon compound is soaked was set to 20° C., and the soaking time was se to 20 hours. After that, the powder of the silicon compound was filtered.

Then, the powder of the silicon compound after contact with the solution B was soaked in a solution (solution C) in which acetone and ethanol were mixed at a volume ratio of 4:1. The soaking time was set to 2 hours. After that, the powder was filtered.

Next, the silicon compound was cleansed, and the cleansed silicon compound was dried under reduced pressure. As was shown above, the silicon-based active material was produced.

Subsequently, a test cell formed of the electrode containing the silicon-based active material produced as was described above and a lithium counter electrode was prepared, and initial charge/discharge characteristics in an initial charge/discharge were investigated. In this case, a 2032 type coin battery was prepared as a test cell.

An electrode containing particles of the silicon-based active material was prepared as shown below. First, the particles of silicon-based active material (powder of the silicon-based compound), a binder (polyacrylic acid (hereinafter, referred to also as PAA)), a conductive assistant 1 (flake-like graphite), and a conductive assistant 2 (acetylene black) were mixed at a dry mass ratio of 76.5:10.0: 10.80: 2.70, followed by diluting with water, thus a paste-like mixture slurry was formed. As a solvent of polyacrylic acid used as the binder, water was used. Then, the mixture slurry was coated on both sides of the current collector with a coating device, followed by drying. As the current collector, an electrolytic copper foil (thickness=20 μm) was used. At the end, baking was performed under vacuum atmosphere at 90° C. for 1 hour. Thus, the negative electrode active material layer was formed.

An electrolytic solution of the test cell was prepared as shown below. After mixing solvents (4-fluoro-1,3-dioxolan-2-one (FEC), ethylene carbonate (EC) and dimethyl carbonate (DMC)), an electrolyte salt (lithium hexafluorophosphate: $LiPF_6$) was dissolved, thus an electrolytic solution was prepared. In this case, the composition of the solvent was set to FEC: EC: DMC=10:20:70 by volume ratio, and a content of the electrolyte salt was set to 1.0 mol/kg to the solvent.

As a counter electrode, a metal lithium foil having a thickness of 0.5 mm was used. Further, as the separator, polyethylene having a thickness of 20 μm was used.

Subsequently, a bottom lid, a lithium foil, and a separator of a 2032 type coin battery were superposed, 150 mL of the electrolytic solution was charged, followed by superposing the negative electrode and the spacer (thickness: 1.0 mm), followed by charging 150 mL of the electrolytic solution, further followed by assembling a spring and an upper lid of the coin battery in this order, followed by caulking with an automatic coin cell caulking device, thus a 2032 type coin battery was prepared.

Subsequently, the prepared 2032 type coin battery was charged at a constant current density of 0.2 $mA/cm^2$ until 0.0 V is reached, at a stage where the voltage reached 0.0 V, charge was performed at a constant voltage of 0.0 V until the current density reaches 0.02 $mA/cm^2$, and during discharge, discharge was performed at a constant current density of 0.2 $mA/cm^2$ until the voltage reaches 1.2 V. Then, the initial charge/discharge characteristics in the initial charge/discharge were investigated.

Subsequently, in order to evaluate the cycle characteristics of the non-aqueous electrolyte secondary battery that uses the negative electrode active material of the present invention, a laminate film type secondary battery 20 as was shown in FIG. 3 was prepared in the following manner.

At the beginning, a positive electrode used for the laminate film type secondary battery was prepared. By mixing 95 parts by mass of $LiCoO_2$ that is a lithium-cobalt composite oxide as a positive electrode active material, 2.5 parts by mass of a positive electrode conductive assistant (acetylene black), and 2.5 parts by mass of a positive electrode binder (polyvinylidene fluoride, PVDF), a positive electrode mixture was prepared. Subsequently, the positive electrode mixture was dispersed in an organic solvent (N-methyl-2-pyrrolidone, NMP) to form a paste-like slurry. Next, the slurry was coated on both sides of a positive electrode current collector by a coating device having a die head, followed by drying with a hot air drier. At this time, the positive electrode current collector having a thickness of 15 µm was used. At the end, compression molding was applied with a roll press.

As a negative electrode, one prepared according to the same procedure as in the electrode containing the silicon-based active material of the test cell was used.

As an electrolytic solution, one prepared according to the same procedure as in the electrolytic solution of the test cell was used.

Next, a laminate film type lithium ion secondary battery was assembled as shown below. At the beginning, an aluminum lead was ultrasonic welded to one end of the positive electrode current collector and a nickel lead was welded to the negative electrode current collector. Subsequently, the positive electrode, the separator, the negative electrode and the separator were laminated in this order and wound in the longitudinal direction to obtain a wound electrode body. A winding end part thereof was fixed by a PET protective tape. As the separator, a laminate film of 12 µm in which a film having porous polyethylene as a main component is sandwiched by a film having porous polypropylene as a main component was used. Subsequently, after sandwiching the electrode body between the exterior members, outer periphery parts excluding one side were sealed by a thermal fusion method to house the electrode body inside. As the exterior member, an aluminum laminated film in which a nylon film, an aluminum foil, and a polypropylene film are laminated was used. Subsequently, the prepared electrolytic solution was charged from an opening part and impregnated under vacuum atmosphere, followed by sealing by the thermal fusion method.

The cycle characteristics (retention rate %) of the laminate film type lithium ion secondary battery prepared as shown above were investigated.

The cycle characteristics were investigated as shown below. At the beginning, two cycles of charge/discharge were carried out under the atmosphere of 25° C. for stabilizing the battery and a discharging capacity at the second cycle was measured. Subsequently, the charge/discharge was performed until a total cycle number becomes 100 cycles, and the discharging capacity was measured in each case. At the end, a capacity retention rate was calculated by dividing the discharging capacity at the $100^{th}$ cycles by the discharging capacity at the $2^{nd}$ cycle (because of % expression×100). As the cycle condition, charge at a constant current density of 2.5 mA/cm$^2$ was performed until reaching to 4.3 V, at the stage when 4.3 V was reached, charge was performed at a constant voltage of 4.3 V until the current density reaches 0.25 mA/cm$^2$. Further, during discharge, discharge was performed until the voltage reaches 3.0 V at the constant current density of 2.5 mA/cm$^2$.

Examples 1-2 to 1-15, Comparative Examples 1-1 to 1-4

Each of the negative electrode active materials was prepared in the same procedure as in Example 1-1 except that species of the aromatic compound added to the solution B, concentrations of the solvent and aromatic compound, the soaking time to the solution B, and the temperature of the solution B were changed as shown in Table 1. And, in the same manner as in Example 1-1, the battery characteristics were evaluated. In Comparative Example 1-1, in the solution B, in the place of the polycyclic aromatic compound, benzene was used. In Comparative Example 1-2, the step 3 was not applied, that is, the silicon compound after Li insertion was not brought into contact with the solution B, but was brought into contact with the solution C. In Comparative Example 1-3, the polycyclic aromatic compound was not dissolved in the solution B, that is, as the solution B, a liquid that does not contain the solute but contains only THF was used. In Comparative Example 1-4, water was used as the solvent.

When the initial charge/discharge characteristics of the test cells (coin battery) and the capacity retention rates of the laminate film type secondary batteries prepared in Examples 1-1 to 1-15 and Comparative Examples 1-1 to 1-4 were investigated, results shown in Table 1 were obtained.

TABLE 1

|  | Solution B | | | | | Battery characteristics | |
| --- | --- | --- | --- | --- | --- | --- | --- |
|  | Species of aromatic compound | Solvent | Concentration (mol/L) | Soaking time | Solution temperature (° C.) | Retention rate (%) | Initial efficiency (%) |
| Example 1-1 | Naphthalene | THF | 2 | 20 Hours | 20 | 83.5 | 78.1 |
| Example 1-2 | Anthracene | THF | 2 | 20 Hours | 20 | 83.4 | 78.1 |
| Example 1-3 | Phenanthrene | THF | 2 | 20 Hours | 20 | 83.1 | 78.1 |
| Example 1-4 | Naphthalene | Acetone | 2 | 20 Hours | 20 | 82.9 | 77.6 |
| Example 1-5 | Naphthalene | Ethyl acetate | 2 | 20 Hours | 20 | 82.8 | 77.8 |
| Example 1-6 | Naphthalene | Ethyl amine | 2 | 20 Hours | 20 | 83.0 | 77.8 |
| Example 1-7 | Naphthalene | Ethanol | 2 | 20 Hours | 20 | 82.4 | 76.2 |
| Example 1-8 | Naphthalene | THF | $1.0 \times 10^{-3}$ | 100 Hours | 20 | 78.8 | 73.3 |
| Example 1-9 | Naphthalene | THF | $1.0 \times 10^{-2}$ | 20 Hours | 20 | 82.6 | 73.6 |
| Example 1-10 | Naphthalene | THF | 3 | 20 Hours | 20 | 83.2 | 78.1 |
| Example 1-11 | Naphthalene | THF | 6 | 20 Hours | 20 | 79.8 | 74.5 |
| Example 1-12 | Naphthalene | THF | 2 | 20 Hours | 50 | 80.5 | 78.3 |
| Example 1-13 | Naphthalene | THF | 2 | 20 Hours | −20 | 80.2 | 78.5 |
| Comparative Example 1-1 | Benzene | THF | 1 | 10 Hours | 20 | — | — |
| Comparative Example 1-2 | — | — | — | — | — | — | — |

TABLE 1-continued

| | Solution B | | | | Battery characteristics | |
| --- | --- | --- | --- | --- | --- | --- |
| | Species of aromatic compound | Solvent | Concentration (mol/L) | Soaking time | Solution temperature (° C.) | Retention rate (%) | Initial efficiency (%) |
| Comparative Example 1-3 | — | THF | No solute | 10 Hours | 20 | — | — |
| Example 1-14 | Naphthalene | THF | 2 | 1 minute | 20 | 76.6 | 70.1 |
| Comparative Example 1-4 | Naphthalene | Water | 2 | 1 minute | 20 | — | — |
| Example 1-15 | Naphthalene | THF | 2 | 5 minutes | 20 | 78.9 | 73.4 |

As is obvious from Table 1, when the solution B containing the polycyclic aromatic compound such as naphthalene, anthracene, or Phenanthrene was used, excellent initial efficiencies were obtained. In particular, like in Example 1-1 to Example 1-3, when naphthalene or anthracene was used as the polycyclic aromatic compound, the retention rate is more improved that when phenanthrene was used. This is because a complex generated by a reaction between the lithium contained in the silicon compound and naphthalene or anthracene is particularly stable, and the lithium is more desorbed from the silicon compound.

Further, as the solvent used in the solution B, at least one or more kinds selected from the ether-based solvents, ketone-based solvents, ester-based solvents, alcohol-based solvents, and amine-based solvents are used. In these solvents, the complexes between the polycyclic aromatic compounds and the lithium may be stably present instantaneously or sustainably, and the lithium is mildly desorbed from the silicon compound. In particular, from results of Examples 1-1 to Examples 1-7, it is found that the ether-based solvents are desirably used.

Further, the concentration of the polycyclic aromatic compound in the solution B is preferably between $10^{-2}$ mol/L to 5 mol/L, and particularly preferably between from $10^1$ mol/L to 3 mol/L. Compared with the case where the concentration of the polycyclic aromatic compound is smaller than $10^{-2}$ mol/L like in Example 1-8, in the case where the concentration of the polycyclic aromatic compound is not smaller than $10^{-2}$ mol/L and not larger than 5 mol/L (for example, Examples 1-1 and 1-3), the retention rates and the initial efficiencies are improved. This is because the lithium is more efficiently desorbed from the silicon compound. Further, compared with the case where the concentration of the polycyclic aromatic compound exceeds 5 mol/L like in Example 1-11, in the case where the concentration of the polycyclic aromatic compound is not smaller than $10^{-2}$ mol/L and not larger than 5 mol/L, the retention rate and the initial efficiency are improved. This is because when the negative electrode active material is formed into the non-aqueous electrolyte secondary battery, the reaction residue is not eluted into the electrolytic solution and the battery characteristics may be suppressed from deteriorating due to the side reaction.

Further, the temperature of the solution B is preferably near to 20° C. This is because when the temperature of the solution B is in the neighborhood of 20° C., the reaction speed is difficult to decrease, and, the lithium compound is difficult to generate precipitate due to the side reaction, the desorption rate of the lithium from the silicon compound is improved. Therefore, compared with the case where the temperature of the solution B is higher or lower than 20° C. like in Example 1-12 and Example 1-13, examples where the temperature of the solution is 20° C. (for example, Example 1-1) had more excellent battery characteristics.

Further, the contact time (soaking time) of the solution B with the silicon compound is preferably 3 minutes or longer. As obvious from Table 1, compared with Example 1-14 where the contact time is shorter than 3 minutes, examples where the contact time is not shorter than 3 minutes (for example, Examples 1-1 and 1-15) had more excellent battery characteristics.

In Comparative Examples 1-1 to 1-3, since the powder of silicon compound was red-heated when the silicon compound and the solution C were contacted, the following evaluation of the battery characteristics could not be conducted. Thus, in Comparative Example 1-2 where the silicon compound was not contacted with the solution B and Comparative Examples 1-1 and 1-3 where the silicon compound was treated with a solution that does not contain the polycyclic aromatic compound, since the lithium was insufficiently desorbed, the violent reaction with the solution C occurred.

Further, in Comparative Example 1-4, since the powder of silicon compound was red-heated when the silicon compound and the solution B were contacted, the following evaluation of the battery characteristics could not be conducted. This is because not the ether-based solvent, ketone-based solvent, ester-based solvent, alcohol-based solvent, or amine-based solvent, but water was used as the solvent.

Examples 2-1 to 2-3

Each of the negative electrode active materials was prepared in the same procedure as in Example 1-1 except that a kind of a solution used as the solution C was changed. Then, in the same manner as in Example 1-1, the battery characteristics were evaluated.

Comparative Example 2-1, Comparative Example 2-2

In Comparative Example 2-1, the negative electrode active material was prepared in the same manner as in Example 1-1 except that the powder of the silicon compound was not contacted with solution C after the contact with the solution B. In Comparative Example 2-2, the negative electrode active material was prepared in the same manner as in Example 1-1 except that THF that is the-ether-based solvent was used as the solvent of the solution C. Then, in the same manner as in Example 1-1, the battery characteristics were evaluated.

When the initial charge/discharge characteristics of the test cells (coin battery) and the capacity retention rates of the laminate film type secondary batteries prepared in Examples 2-1 to 2-3 and Comparative Example 2-1 and Comparative Example 2-2 were investigated, results shown in Table 2 were obtained.

TABLE 2

|  | Solution C | Retention Rate (%) | Initial Efficiency (%) |
|---|---|---|---|
| Example 1-1 | Acetone:ethanol = 4:1 (volume ratio) | 83.5 | 78.1 |
| Example 2-1 | Ethanol | 83.3 | 77.9 |
| Example 2-2 | Acetone:acetic acid = 4:1 (volume ratio) | 82.3 | 76.3 |
| Example 2-3 | Saturated aqueous solution of lithium carbonate | 83.6 | 78.0 |
| Comparative Example 2-1 | — | — | — |
| Comparative Example 2-2 | THF | — | — |

When the solution C was not brought into contact with the silicon compound that had been brought into contact with the solution B (Comparative Example 2-1) and when a solvent other than the alcohol-based solvent, the carboxylic acid-based solvent, or water was used as the solvent of the solution C (Comparative Example 2-2), the silicon compound violently reacted during preparation of the negative electrode slurry and could not be formed into the electrode.

On the other hand, in Examples 2-1 to 2-3, the violent reaction did not occur during preparation of the slurry, and the negative electrode active material could be formed into the electrode without any problem. Further, as the solvent of the solution C, the alcohol-based solvent, carboxylic acid-based solvent or water is used, but, an acetone/ethanol mixed solvent or an aqueous solution saturated with lithium carbonate may be particularly preferably used. This is because in the acetone/ethanol mixed solvent, the active Li in the silicon compound is mildly and sufficiently deactivated, and, in the aqueous solution saturated with lithium carbonate, due to a large heat capacity of the solvent, the active Li in the silicon compound is deactivated without accompanying a large temperature increase. As obvious from Table 2, in Example 1-1 and Example 2-3 that used these solvents, the retention rates and initial efficiencies were particularly excellent.

Examples 3-1 to 3-19

Each of the negative electrode active materials was prepared in the same manner as in Example 1-1 except that species of the aromatic compound of the solution A, species of the solvent, a concentration of the aromatic compound, the soaking time to the solution A, and the temperature of the solution A were changed as shown in Table 3. Then, in the same manner as Example 1-1, the battery characteristics were evaluated.

Comparative Example 3-1

The negative electrode active material was prepared in the same manner as in Example 1-1 except that inserting the lithium into the silicon compound was not performed. Then, in the same manner as in Example 1-1, the battery characteristics were evaluated.

When the initial charge/discharge characteristics of the test cells (coin battery) and the capacity retention rates of the laminate film type secondary batteries prepared in Examples 3-1 to 3-19 and Comparative Example 3-1 were investigated, results shown in Table 3 were obtained.

TABLE 3

|  | Solution A | | | | | Battery characteristics | |
|---|---|---|---|---|---|---|---|
|  | Species of aromatic Compound | Solvent | Concentration (mol/L) | Soaking time | Temperature of solution (° C.) | Retention rate (%) | Initial efficiency (%) |
| Example 1-1 | Biphenyl | THF | 1 | 10 Hours | 20 | 83.5 | 78.1 |
| Example 3-1 | Naphthalene | THF | 1 | 20 Hours | 20 | 83.4 | 76.5 |
| Example 3-2 | Phenanthrene | THF | 1 | 20 Hours | 20 | 83.1 | 75.5 |
| Example 3-3 | Biphenyl | Diethyl ether | 1 | 10 Hours | 20 | 83.2 | 75.6 |
| Example 3-4 | Biphenyl | tert-butyl methyl ether | 1 | 10 Hours | 20 | 83.0 | 75.4 |
| Example 3-5 | Biphenyl | THF | $1.0 \times 10^{-3}$ | 20 Hours | 20 | 83.0 | 74.1 |
| Example 3-6 | Biphenyl | THF | $1.0 \times 10^{-2}$ | 10 Hours | 20 | 83.3 | 76.4 |
| Example 3-7 | Biphenyl | THF | 4.5 | 10 Hours | 20 | 83.2 | 76.8 |
| Example 3-8 | Biphenyl | THF | 6 | 20 Hours | 20 | 82.6 | 74.2 |
| Example 3-9 | Biphenyl | THF | 1 | 10 Hours | 50 | 83.2 | 77.1 |
| Example 3-10 | Biphenyl | THF | 1 | 10 Hours | −20 | 83.3 | 77.2 |
| Example 3-11 | Biphenyl | THF | 1 | 50 Hours | 20 | 83.4 | 78.3 |
| Example 3-12 | Biphenyl | THF | 1 | 100 Hours | 20 | 83.5 | 78.5 |
| Example 3-13 | Biphenyl | THF | 1 | 200 Hours | 20 | 83.5 | 78.5 |
| Example 3-14 | — | Ethylene diamine | No solute | 10 Hours | −20 | 82.1 | 77.6 |
| Example 3-15 | — | Diglyme | No solute | 20 Hours | 150 | 80.2 | 77.1 |
| Comparative Example 3-1 | — | — | — | — | — | 72.6 | 66.1 |
| Example 3-16 | Benzene | THF | 1 | 10 Hours | 20 | 76.6 | 70.5 |
| Example 3-17 | Biphenyl | THF | 1 | 1 minute | 20 | 76.7 | 70.5 |
| Example 3-18 | Biphenyl | THF | 1 | 5 minutes | 20 | 80.1 | 72.1 |
| Example 3-19 | — | Ethylene diamine (solute) and THF (solvent) | 1 (Ethylene diamine) | 10 Hours | 20 | 82.3 | 77.8 |

As a method of inserting the lithium into the silicon compound, there are methods of bringing the silicon compound into contact with the solution A containing the lithium. Among these, it is preferable to use the solution $A_1$ that contains lithium and the polycyclic aromatic compound or its derivative or the straight chain polyphenylene compound or its derivative or to use the solution $A_2$ (Example 3-19) containing the lithium and an amine as the solution A containing the lithium, and among these, it is particularly preferable to use the solution $A_1$. This is because the solution $A_1$ may be handled in the neighborhood of the room temperature. Further, when naphthalene or phenanthrene was used as the polycyclic aromatic compound contained in the solution $A_1$, or biphenyl was used as the straight chain polyphenylene compound, compared with the case where the aromatic compound was not added (Examples 3-14 and 3-15) and the case where benzene that is not the polycyclic aromatic compound or the straight chain polyphenylene compound was added (Example 3-16), a significant improvement of the initial efficiency was found. Further, in particular, when biphenyl was used as the straight chain polyphenylene compound, the battery characteristics were more improved. This is since the complex generated by the reaction of lithium and biphenyl has high activity and stability, the lithium insertion into the silicon compound may be maintained at a more rapid speed.

Further, more than the case where diethyl ether or tert-butyl methyl ether was used as the ether-based solvent (Examples 3-3 and 3-4), the case where THF was used (Example 1-1) had more improved battery characteristics. This is because in THF having relatively high dielectric constant among the ether-based solvents, a complex between the lithium and the polycyclic aromatic compound or the straight chain polyphenylene compound is stably present, the lithium insertion into the silicon compound is likely to be sustained.

Further, the concentration of the polycyclic aromatic compound or the straight chain polyphenylene compound in the solution $A_1$ is preferably between from $10^{-2}$ mol/L to 5 mol/L, and particularly preferably between from $10^{-1}$ mol/L to 3 mol/L. Compared with the case where the concentration of the polycyclic aromatic compound or the straight chain polyphenylene compound is smaller than $10^{-2}$ mol/L like in Example 3-5, in the case where the concentration of the polycyclic aromatic compound or the straight chain polyphenylene compound is $10^2$ mol/L or larger and 5 mol/L or smaller (for example, Examples 3-6, 3-7, and 1-1), the retention rates and the initial efficiencies are improved. This is because the lithium is more efficiently inserted into the silicon compound. Further, compared with the case where the concentration of the polycyclic aromatic compound or the straight chain polyphenylene compound exceeds 5 mol/L like in Example 3-8, when the concentration of the polycyclic aromatic compound or the straight chain polyphenylene compound is $10^{-2}$ mol/L or larger and 5 mol/L or smaller, the retention rate and the initial efficiency are improved. This is because when the negative electrode active material is formed into the non-aqueous electrolyte secondary battery, the reaction residue is not eluted into the electrolytic solution and the battery characteristics may be suppressed from deteriorating due to the side reaction. It is to be noted that, in Example 3-8, biphenyl is partially remained without dissolving.

Further, the temperature of the solution A is preferably near to 20° C. This is because when the temperature of the solution A is in the neighborhood of 20° C., the reaction speed is difficult to decrease, and, the lithium compound is difficult to generate precipitate due to the side reaction, a reaction rate of an insertion reaction of the lithium from the silicon compound is improved. Therefore, compared with the case where the temperature of the solution B is higher or lower than 20° C. like in Examples 3-9 and 3-10, examples where the temperature of the solution is 20° C. (for example, Example 1-1) had more excellent battery characteristics.

Further, the contact time of the powder of silicon compound and the solution A is desirable 3 minutes or longer and 100 hours or shorter. When the contact time is not shorter than 3 minutes (for example, Example 3-18), compared with the case of shorter than 3 minutes (Example 3-17), the lithium may be sufficiently inserted into the silicon compound. Still further, around the time when the contact time reaches 100 hours, the lithium insertion into the silicon compound reaches a substantial equilibrium.

In Comparative Example 3-1, since the lithium is not inserted into the silicon compound, the electrode could be formed without problem, but the battery characteristics were deteriorated.

It is to be noted that the present invention is not limited to the above examples. The above examples are merely exemplary, and, all of what has the substantially same configuration as technical idea described in claims of the present invention and has the similar effects are included in the technical range of the present invention.

The invention claimed is:

1. A production method of a negative electrode active material for non-aqueous electrolyte secondary batteries containing $SiO_x$ wherein $0.5 \le x \le 1.6$ as a silicon compound that contains Li, comprising the steps of:
   preparing $SiO_x$ wherein $0.5 \le x \le 1.6$ as a silicon compound;
   forming a carbon film on a surface of the silicon compound;
   inserting lithium into the silicon compound covered with the carbon film with a solution A containing lithium, an ether-based solvent and a straight chain polyphenylene compound or its derivative;
   making the silicon compound into which the lithium has been inserted contact with a solution B containing a polycyclic aromatic compound or a derivative thereof or both thereof containing one or more kinds selected from an ether-based solvent, a ketone-based solvent, an ester-based solvent, an alcohol-based solvent, and an amine-based solvent as the solvent to thereby desorb only a part of the lithium from the silicon compound wherein lithium is inserted; and
   making the silicon compound that has been contacted with the solution B contact with a solution C containing one or more kinds selected from the alcohol-based solvent, a carboxylic acid-based solvent, and water as the solvent,
   wherein treatment conditions when contacting the silicon compound into which the lithium has been inserted with the solution B are adjusted to desorb only a part of the lithium, the treatment conditions including at least a concentration of the polycyclic aromatic compound or a derivative thereof or both thereof in the solution B; a reaction temperature when contacting the silicon compound into which the lithium has been inserted with the solution B; and a contact time of the silicon compound into which the lithium has been inserted with the solution B.

2. The production method of a negative electrode active material for non-aqueous electrolyte secondary batteries according to claim 1, wherein in the step of making the silicon compound contact with the solution B, the silicon compound is contacted with the solution B for 3 minutes or longer.

3. The production method of a negative electrode active material for non-aqueous electrolyte secondary batteries according to claim 1, wherein in the step of inserting lithium, the silicon compound is contacted with the solution A for 3 minutes or longer to insert the lithium into the silicon compound.

4. The production method of a negative electrode active material for non-aqueous electrolyte secondary batteries according to claim 2, wherein in the step of inserting lithium, the silicon compound is contacted with the solution A for 3 minutes or longer to insert the lithium into the silicon compound.

5. The production method of a negative electrode active material for non-aqueous electrolyte secondary batteries according to claim 1, wherein one or more kinds of biphenyl, terphenyl, and derivative thereof are used as the straight chain polyphenylene compound.

6. The production method of a negative electrode active material for non-aqueous electrolyte secondary batteries according to claim 1, wherein one containing the alcohol-based solvent or water as the solvent is used as the solution C.

7. The production method of a negative electrode active material for non-aqueous electrolyte secondary batteries according to claim 1, wherein the method includes the step of forming an electrode containing the silicon compound before the step of inserting lithium, and to the silicon compound contained in the electrode, the step of inserting lithium, the step of making the silicon compound contact with the solution B, and the step of making the silicon compound contact with the solution C are applied.

8. A non-aqueous electrolyte secondary battery having an electrode containing the negative electrode active material for non-aqueous electrolyte secondary batteries produced according to the production method of negative electrode active material for non-aqueous electrolyte secondary batteries according to claim 1.

* * * * *